United States Patent

Marriott

[11] Patent Number: 6,155,220
[45] Date of Patent: Dec. 5, 2000

[54] PIEZOELECTRIC DIFFERENTIAL CAM PHASER

[75] Inventor: Craig D. Marriott, Rochester Hills, Mich.

[73] Assignee: General Motors Corporation, Detroit, Mich.

[21] Appl. No.: 09/395,022

[22] Filed: Sep. 13, 1999

[51] Int. Cl.[7] .................................................... F01L 1/34
[52] U.S. Cl. ........................ 123/90.17; 74/568 R; 464/73
[58] Field of Search ............................. 123/90.15, 90.17, 123/90.31; 74/567, 568 R; 464/1, 2, 160, 161

[56] References Cited

U.S. PATENT DOCUMENTS

| 5,327,859 | 7/1994 | Pierik et al. | 123/90.17 |
| 5,680,836 | 10/1997 | Pierik | 123/90.17 |
| 5,680,837 | 10/1997 | Pierik | 123/90.17 |

OTHER PUBLICATIONS

Harmonic Drive Technologies, Poner Transmission Products Catalog, 1991 Physik Instrumente Catalog, Feb. 1998, pp. 4.15–4.42.

*Primary Examiner*—Thomas Denion
*Assistant Examiner*—Patrick Cavaliere
*Attorney, Agent, or Firm*—Karl F. Barr, Jr.

[57] ABSTRACT

A compact cam phaser has a flexible spline deformed into a nonround shape and engaging a mating ring gear or circular member at angularly spaced locations for transferring camshaft drive torque between them. The spline has projecting lobes with teeth or friction surfaces which engage like surfaces formed on the mating gear or member. The spline and ring gear have a differential length or number of teeth. The phaser includes a plurality of angularly spaced radial piezo actuators, which expand and contract to cause the projecting lobes (but not the flexible spline itself) to travel around the circular ring gear in rotating waves. Thus, each point of the flexible spline is moved sequentially into and out of contact with the ring gear as the contact points (lobes) rotate in waves. Since the number of spline teeth differs from the ring gear, one revolution of the waves causes the spline to move relative to the ring gear a number of teeth equal to the differential. The phase angle of the flexible spline relative to the ring gear, and the camshaft relative to the crankshaft, is thus changed by an amount proportional to the revolutions of the waves. The piezo actuators are controlled in known manner by the application and withdrawal of electric voltage which causes the actuators to alternately expand and contract, driving the wave rotation of the spline lobes rapidly to change the phase angle. Various embodiments are disclosed.

17 Claims, 3 Drawing Sheets

PIEZOELECTRIC DIFFERENTIAL CAM PHASER

TECHNICAL FIELD

This invention relates to cam phasers for varying the phase angle of a camshaft relative to a crankshaft of an engine.

BACKGROUND OF THE INVENTION

It is known in the art relating to engines to provide a cam phaser for varying the timing, or phase angle, of a valve actuating camshaft relative to a crankshaft by which the camshaft is driven. In general, such cam phasers are relatively complex and costly as well as adding to the size and mass of the associated engine.

SUMMARY OF THE INVENTION

The present invention provides a relatively simple and compact cam phaser capable of mounting within a pulley or drive gear of an engine camshaft drive. In one embodiment, a flexible spline, deformed into an elliptical or nonround shape, engages a mating circular member at diametrically opposite locations for transferring camshaft drive torque between them. The spline is an inner member drivably connected with a camshaft while the circular member is an outer ring gear or sprocket with exterior teeth for connection through a timing chain, belt or gear with an associated engine crankshaft. The inner spline has, in effect, two oppositely projecting lobes at which engagement takes place, preferably between teeth formed on the engaging surfaces. The spline and the outer ring gear differ in the length of their contacting surfaces by a differential length which, in this case, is equal to two teeth.

For changing the phase angle between the crankshaft and camshaft, the phaser includes a plurality of angularly spaced radially extending piezoelectric actuators, or piezo actuators, which expand and contract to cause the projecting lobes (but not the flexible spline itself) to travel around the circular ring gear in rotating waves. In this way, each point of the flexible spline is moved sequentially into and out of contact with the outer ring gear as the contact points (lobes) rotate in dual waves. Since the peripherally shorter spline has two less teeth than the ring gear, one revolution of the waves causes the spline to move two teeth relative to the ring gear in the direction opposite to the wave rotation. The phase angle of the flexible spline relative to the ring gear, and the camshaft relative to the crankshaft, is thus changed by an amount proportional to the number of revolutions of the waves and in the direction opposite to the waves.

The piezo actuators are controlled in known manner by the sequential application and withdrawal of electric voltage which causes the actuators to alternately expand and contract, driving the wave rotation of the spline lobes rapidly to obtain the desired change in phase angle. In this way, the cam phaser is operable to vary the camshaft phase angle with a simple and easily controlled mechanism having a minimum number of components as compared to other known cam phasers.

Various alternative embodiments of the invention are contemplated. For example, the spline and ring gear engaged surfaces could rely on friction instead of engaging teeth to carry their torque loads and provide the desired phase changes. The number of lobes, or points of engagement with the ring gear could be varied to one or three or more instead of two. However, having only one lobe would create unbalanced radial loads in the mechanism. The differential spacing, or number of teeth, in toothed versions, would need to be one or more teeth for each lobe. In the above example, the differential (two) includes one tooth difference for each lobe.

The mechanism can also be inverted so that the flexible spline is positioned outside the ring gear and the radially oriented piezo actuators engage the outer side of the spline and are constrained within an outer ring. (In this case, the ring gear has external teeth as a spur gear but is included within the generic term "ring gear" as used herein.) The actuators will then force the spline to form inward lobes that engage the inner ring gear which has a smaller periphery and/or a smaller number of teeth than the flexible spline. In this case, rotation of the lobes in waves will cause the flexible spline to change the phase angle relative to the inner ring gear in the same direction as the direction of wave rotation.

Still another embodiment could include dual phaser elements including a first element with an outer ring gear and associated inner flexible spline combined with a second element located concentrically inside the first element and including an inner ring gear and associated outer flexible spline. The piezo actuators are placed between the two flexible splines to actuate them both and create identically rotating waves that simultaneously change the phase of both phaser elements in the same direction. Thus, the amount of phase change for each wave rotation is doubled but the torque capacity of the drive is reduced.

In a variation of the foregoing embodiments, the teeth of the ring gear or gears and the associated flexible splines could be beveled and one of these members could be axially biased to take up lash in the drive at the points of engagement of the spline and gear.

These and other features and advantages of the invention will be more fully understood from the following description of certain specific embodiments of the invention taken together with the accompanying drawings.

DESCRIPTION OF THE PREFERRED EMBODIMENT

Figure 1:
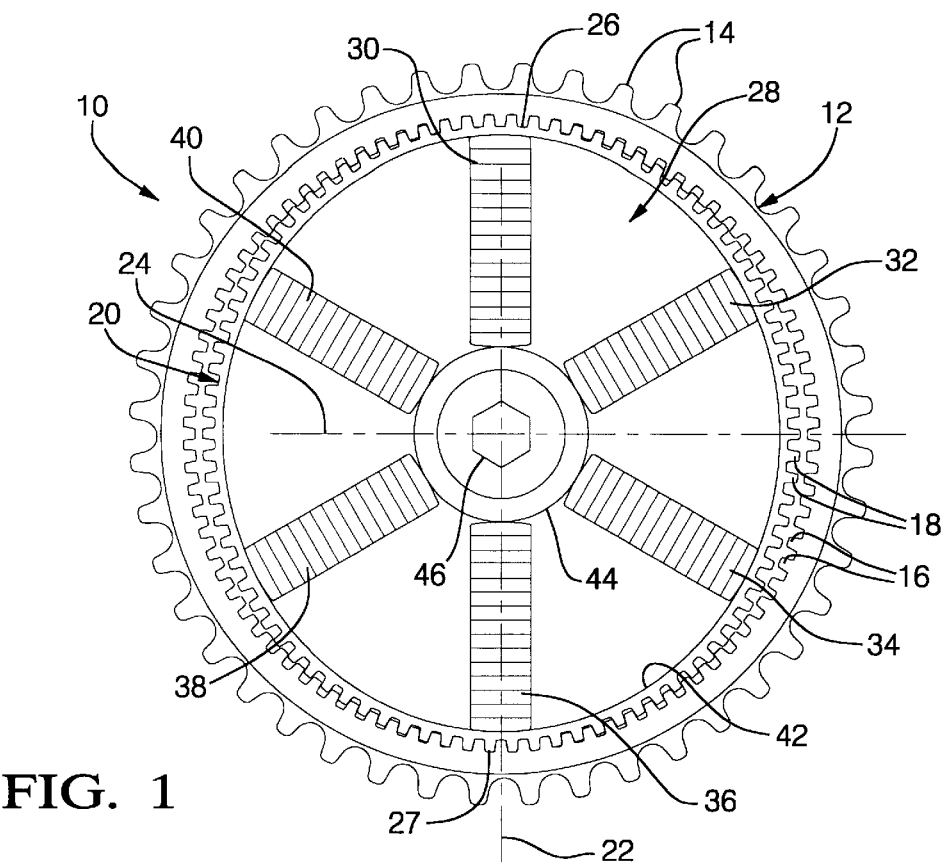
FIG. 1 is a schematic end view of a first embodiment of piezoelectric differential cam phaser according to the invention.
Figure 2:
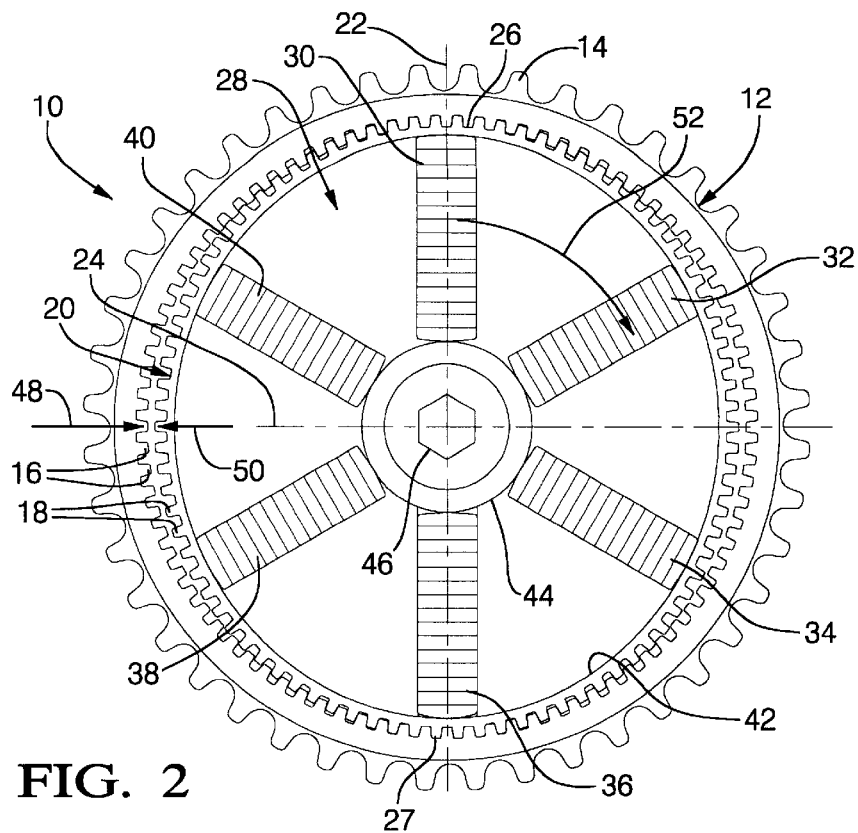
FIG. 2 is a view similar to FIG. 1 showing the phaser in an initial position of operation.
Figure 3:
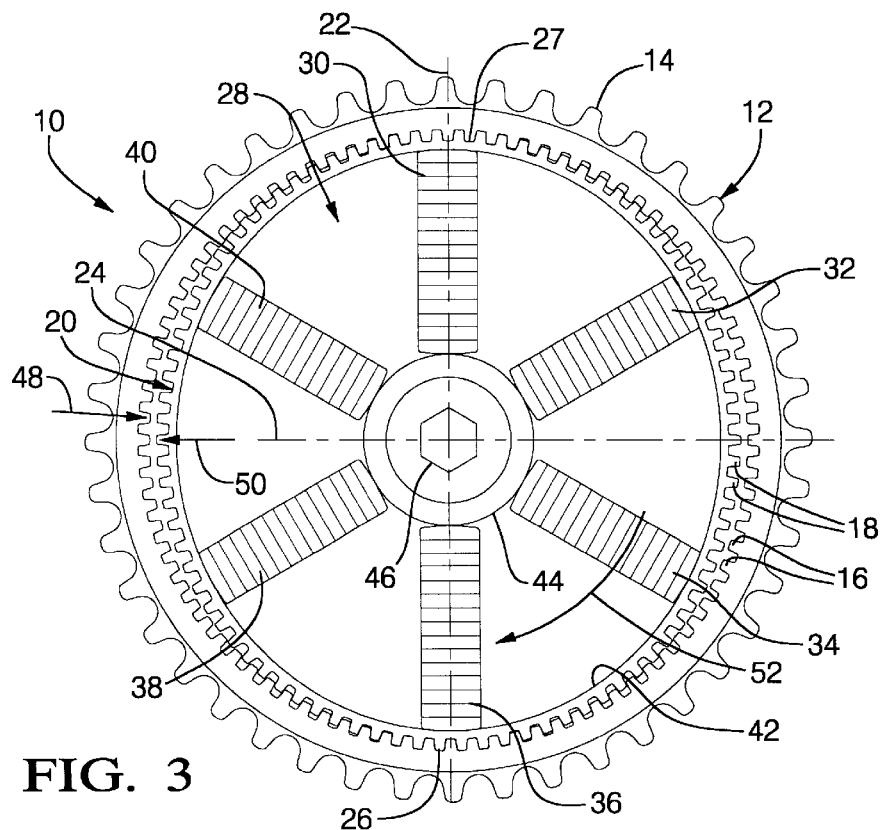
FIG. 3 is a view similar to FIG. 2 but showing the phaser in an advanced position of operation with a one tooth phase angle change.

Referring first to FIGS. 1–3 of the drawings in detail, numeral 10 generally indicates a first embodiment of piezoelectric differential cam phaser according to the invention. Phaser 10 includes an outer ring gear 12 which carries external teeth 14 which could be engaged by a timing chain or belt so that the outer ring gear becomes a chain sprocket or belt pulley. Alternatively, the teeth 14 could be formed as gear teeth to engage mating teeth of a drive or idler gear, not shown. The drive or idler gear, chain sprocket or belt pulley would provide for connection of the ring gear with a crankshaft, not shown, by which the cam phaser in the form of a pulley, sprocket or gear, would be driven.

On its internal periphery, the circular ring gear 12 includes internal teeth 16 which extend around its inner periphery. Teeth 16 are engaged by mating teeth 18 of an endless flexible internal spline 20. The spline, if circular, would have a somewhat smaller diameter than that of the outer ring gear 12. Thus, the spline is provided with a smaller number of teeth than are on the ring gear, the differential number of teeth being two. In other words, the spline has two fewer teeth than the ring gear. However, the spline 20 is not circular, but is deformed into a generally elliptical shape or configuration having a major axis 22 extending vertically in FIG. 1, and a minor axis 24 extending horizontally in FIG. 1. The spline is thus flexed so that its diameter is increased along the major axis so that the teeth 18 of the spline are forced into engagement with the internal teeth 16 of the ring gear 12 forming two oppositely extending protrusions of the spline, which we refer to as lobes 26, 27. At positions away from the lobes 26, 27, the flexible spline diameter is reduced, reaching its minimum along the minor axis 24 where the teeth 16, 18 are separated by a gap.

Within the flexible spline 20 is a piezoelectric wave generator 28 formed by a plurality, in this case six, of piezoelectric element stacks or piezo actuators 30, 32, 34, 36, 38, 40. These extend from an inner peripheral surface 42 of the flexible spline 20 radially inward to a cylindrical outer surface of an inner ring 44 which acts as a hub. The hub 44 is, in turn, secured by a screw fastener 46. It should be understood that suitable means, not shown, are provided for connecting the flexible spline 20 with the hub 44 so that they rotate together to drive an associated camshaft, not shown, to which the screw fastener 46 connects this central portion of the cam phaser 10.

The piezoelectric elements or actuators 30–40 operate in known manner to extend or increase their length with the application of an electric voltage. Application of an inverse voltage likewise causes the actuators to shorten or retract. Thus, the actuators 30 are electrically operated by a suitable control system, not shown, to expand and contract, as required, in order to initially deform the flexible spline 20 into the approximately elliptical configuration shown in FIG. 1 with the teeth of the spline engaged with the teeth of the ring gear along the major axis 22.

Changing the phase angle between the camshaft, which is connected to the central wave generator and the flexible spline 20, and the crankshaft, which is connected to the outer ring gear 12, is accomplished by sequentially expanding and contracting the actuators 30–40 so that the points of contact or engagement of the teeth of the flexible spline and the ring gear rotate around the internal surface of the ring gear in waves.

The operation of this cam phaser embodiment and the formation and function of the waves is best explained by reference to FIGS. 2 and 3. FIG. 2 illustrates the mechanism in an initial position wherein arrow 48, indicating a point on the outer ring gear 12, is radially aligned with arrow 50 indicating a point on the flexible spline 20. Thereafter, the actuators 30–40 are sequentially adjusted to move the position of the lobes 26, 27 clockwise as indicated by arrows 52 until the wave has traversed one-half of a revolution so that the upper lobe 26 is now positioned at the bottom of the cam phaser and the lower lobe 27 is now positioned at the top of the cam phaser, as indicated in FIG. 3.

It should be understood that this rotation of waves one-half revolution does not involve actual rotation of the flexible spline one-half turn relative to the outer ring gear. Instead, the actuators 30–40 are sequentially adjusted so that actuators 30 and 36 are first retracted while actuators 32, 38 are first expanded and then retracted, actuators 34, 40 are subsequently expanded and then retracted, and actuators 30, 36 are subsequently expanded again to their full extension. This causes the engagement points of the flexible spline with the outer ring gear to rotate clockwise from actuators 30, 36 to actuators 32, 38, then to actuators 34, 40 and, finally, back to actuators 30, 36, creating the so-called waves which have now moved 180 degrees or one-half turn. Thus, the spline is flexed so that the lobes 26, 27 are rotated in dual waves which move clockwise from their initial positions of FIG. 2 to subsequent positions 180 degrees around the periphery of the ring gear 12, as shown in FIG. 3.

This wave rotation of the lobes causes a relative phase rotation between the flexible spline 20 and the outer ring gear 12. Thus, as shown in FIGS. 2 and 3, the ring gear 12 has moved clockwise a distance of one tooth of the flexible spline relative to the spline, as indicated in FIG. 3 by the movement of arrow 48 relative to arrow 50. To state the result in another way, rotation of the waves a half-turn, or 180 degrees, causes rotation of the flexible spline, relative to the outer ring gear, a circumferential distance of one spline tooth in a direction opposite to the direction of rotation of the waves. Obviously, a full wave rotation of 360 degrees would cause the flexible spline to move two teeth counterclockwise, or in a direction opposite the direction of rotation of the waves. The reason for this specific result is that the flexible spline is formed with a smaller periphery than that of the mating periphery of the outer ring gear and the spline is provided with two fewer teeth than are formed on the mating outer ring gear. Thus, the flexible spline and the ring gear are in toothed engagement wherever the opposite lobes are located as the waves rotate around the ring gear. These points are shown on the major axes in FIGS. 2 and 3.

Intermediate these points, the teeth of the flexible spline progress out of phase with the teeth of the outer ring gear so that for each half turn, the flexible spline loses one tooth of rotation, or moves one tooth in a reverse direction for each half turn or half rotation of the waves.

In the foregoing manner, a phase change of any desired amount may be made between the flexible spline connected in this instance to the camshaft, and the outer ring gear connected in this instance to the engine crankshaft, not shown, by merely electrically actuating the actuators 30–40 in sequential manner to create rotating waves in the flexible spline. These waves can be rapidly moved in either direction to change the phase angle quickly to the extent desired. Again, it is emphasized that during this motion, the actual change of phase between the outer ring gear and the flexible spline is relatively small compared to the number of rotations of the waves in the spline. Therefore, the phase change requires a relatively small force input for moving the components relative to one another since the actual amount of relative motion is small. Of course, the total phase change is not limited and could be as much as desired, but it would still be small relative to the number of wave rotations needed to obtain this angular phase change.

While the embodiment just described is configured to have two opposite lobes 26, 27 of the flexible spline, it should be understood that other numbers of lobes could be selected. If desired, a single lobe could be used, but that would have the effect of creating side forces on the mechanism and would probably not normally be utilized for a practical mechanism. On the other hand, the number of lobes could be increased to three or four, if desired, so that there would be three or four points of engagement of the flexible spline with the ring gear teeth spaced at equal angular intervals around the periphery of the flexible spline and ring gear.

In all cases, the minimum differential of the number of teeth on the ring gear minus the number of teeth on the flexible spline would equal one for each lobe of the flexible spline which engages the ring gear. However, if desired, the number of teeth could be increased by multiples of the number of lobes to the extent that this is practical in the design of the specific mechanism. Thus, the two lobed cam phaser shown in the drawings could be modified to have a tooth differential of four; that is, the flexible spline could have four teeth less than the outer ring gear. This would result in an angular phase change of four teeth of the flexible spline for each wave rotation of the mechanism.

It should be further noted that, if desired, the mating surfaces of the spline and outer ring gear could be modified to eliminate the teeth and utilize instead a frictional surface contact which could create a phase change in the same manner as just described, but limited only by the relative peripheral lengths or round diameters of the ring gear and flexible spline surfaces. These could be selected in any desired differential lengths unrestricted by the size of tooth spacing, as is the case with the illustrated and preferred embodiment.

Figure 4:
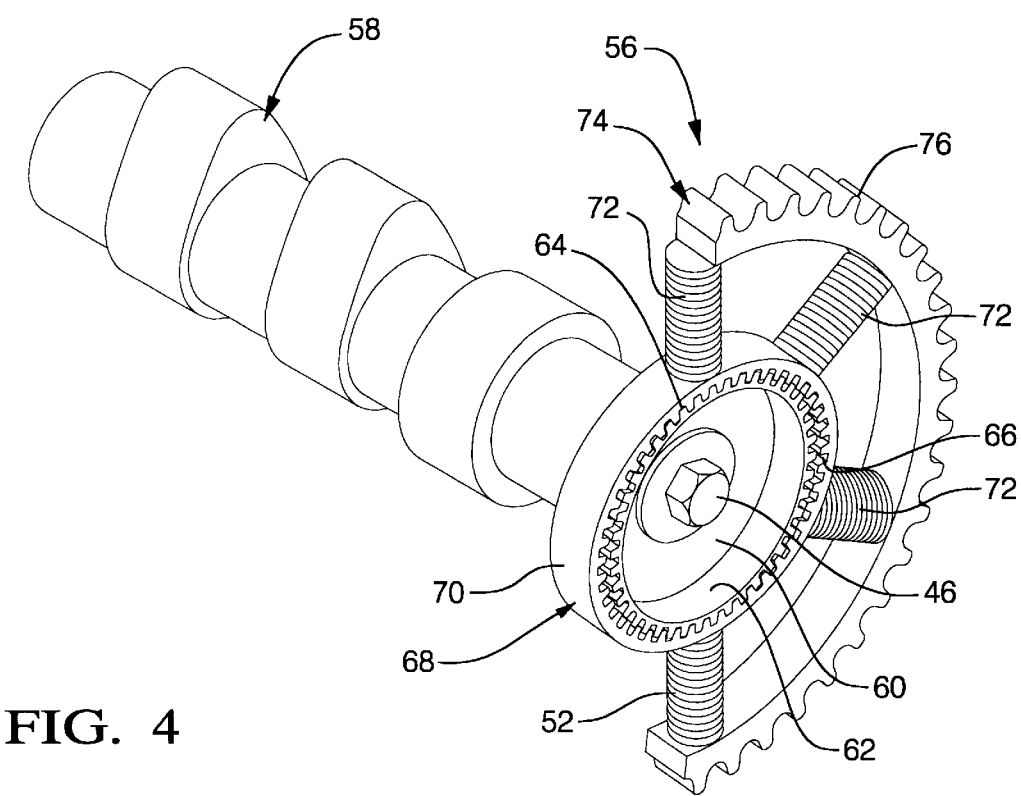
FIG. 4 is a semi-schematic pictorial view of an inverted embodiment of cam phaser according to the invention with an attached camshaft.
Figure 5:
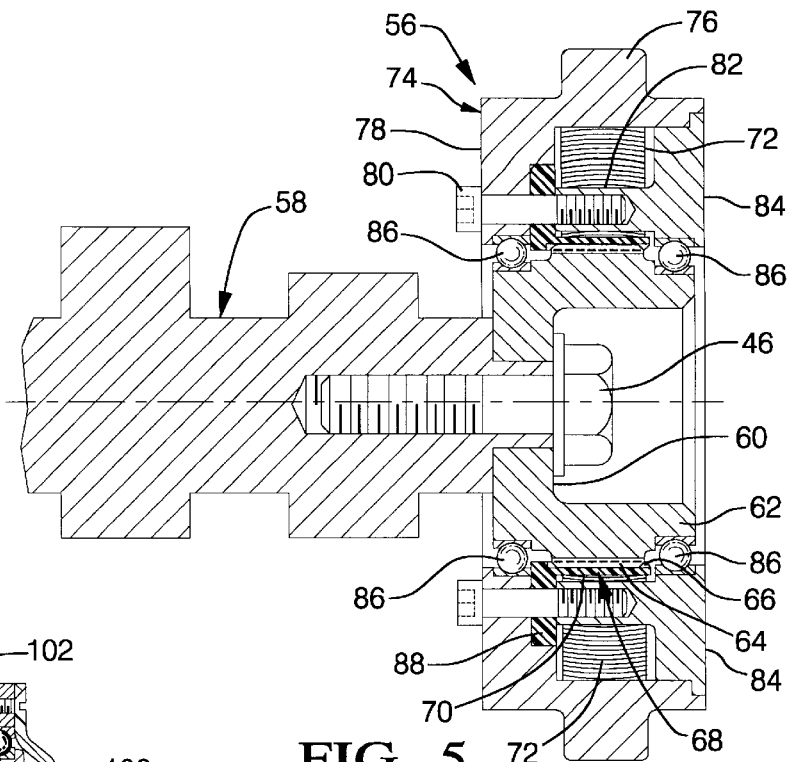
FIG. 5 is a cross-sectional view of a phaser of the inverted type of FIG. 4 as mounted on an engine camshaft.

Referring now to FIGS. 4 and 5, there is shown an alternative embodiment of cam phaser formed according to the invention, and generally indicated by numeral 56. As will be seen, phaser 56 has an essentially inverted differential cam phasing mechanism from the embodiment 10, previously described. In particular, FIG. 4 shows a camshaft 58 connected by a screw fastener 46 to an inner hub 60 formed integral with an external gear 62, or ring gear, formed as a circular ring with teeth 64 on its outer periphery. Teeth 64 are engaged by mating teeth 66 of an internal flexible spline 68 that has an internal diameter or circumference somewhat larger than the corresponding outer circumference of the external ring gear 62.

An outer surface 70 of the flexible spline is engaged by piezo actuators 72. These are like the actuators 30–40 of the first embodiment and comprise a plurality of piezo elements stacked to form the individual actuators. The actuators 72 extend radially outward from the outer surface 70 of the flexible spline 68 to engage an inner surface of a pulley, sprocket or gear member 74. Member 74 includes external teeth 76 for connection with a crankshaft through a timing chain, belt or idler gear as desired. Portions of the pulley/sprocket/gear 74 and piezo actuators 72 are omitted from the drawing for clarity.

While FIG. 4 is somewhat schematic in nature, FIG. 5 shows in cross section a completed assembly of the alternative cam phaser embodiment 56 connected with the camshaft 58, wherein like numerals indicate like parts. In this assembled version, the member 74 has a depending flange 78 that is secured by screws 80 to bosses 82 of a front cover 84. The cover 84 and flange 78 enclose the actuators 72 and are supported by bearings 86 for relative movement of the external gears 62 and the member 74.

Pulley/sprocket/gear member 74 moves with the flexible spline 68 during phase changes which is ensured by a radial flange 88 connected with one edge of the spline 68 and extending into a pocket between the bosses 82 and gear flange 78 for connection with the screws 80 to drive these members together.

In operation, the actuators 72 again deform the flexible spline 68 into a nonround, preferably generally elliptical, configuration so that the inner teeth of the spline contact the exterior teeth of the external gear 62 only at two opposing locations. These contact locations may be described as forming inwardly extending lobes similar to, but reversed from, the outwardly extending lobes of the first described embodiment. Other than at the opposite lobes, the spline is expanded or deformed away from the round exterior of the external gear 62 so that the teeth contact only at the opposite lobe locations. This is similar to the first described embodiment, but inverted in that the lobes extend inward to contact the gear.

Causing a phase change is then accomplished in the same manner as before by expanding and contracting in sequence the piezo actuators 72. This creates dual waves of the internally extending lobes of the flexible spline to cause the points of engagement with the external gear to rotate in one or the opposite direction. This wave rotation of the spline causes the spline, which is now on the exterior of the gear, to advance one tooth for each half rotation of the waves, assuming that the tooth differential between the engaged elements is two teeth as in the first described embodiment. Obviously, if other tooth differentials, such as four, were involved or the number of lobes differed, then the number of teeth advanced would be adjusted accordingly as in the first described embodiment.

Figure 6:
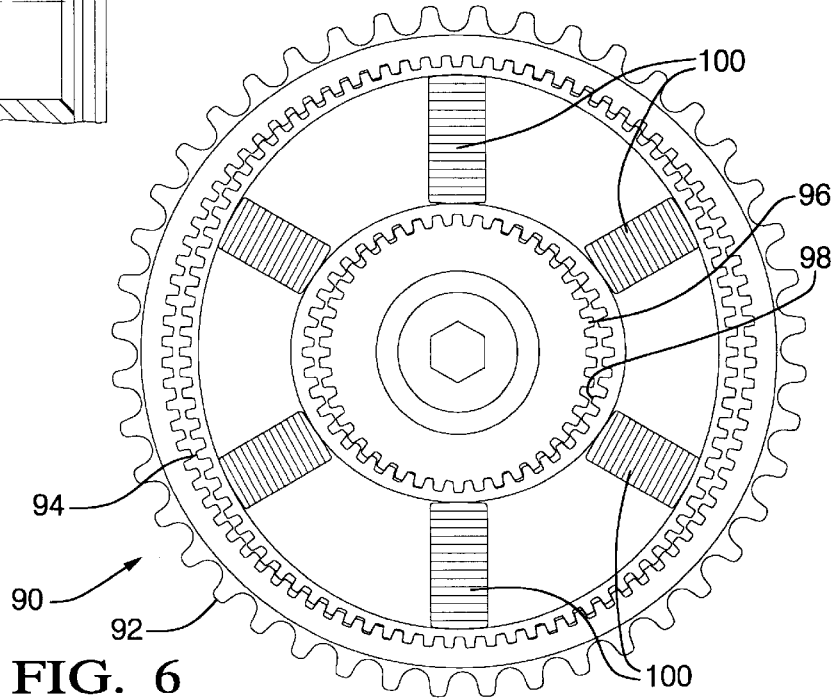
FIG. 6 is a cross-sectional view of a dual element cam phaser including both normal and inverted phaser elements in series connected with the same wave generator actuators.

Referring to FIG. 6, another embodiment of cam phaser which may be called a dual phaser 90 is illustrated. Phaser 90 includes a first phaser element having an outer ring gear 92 engaging an inner flexible spline 94 as in cam phaser 10. A second inverted phaser element is disposed concentrically within the first element and includes an inner ring gear 96 and an outer flexible spline 98 as in cam phaser 56. Piezo actuators 100 form a common wave generator located between and engaging both flexible splines 94, 98. The outer ring gear includes In operation, as the piezo actuators sequentially expand and contract, they form rotating waves in both of the dual elements which cause a simultaneous change of phase in both elements in the same direction. The result is that the phase change between the outer ring gear and the inner ring gear is doubled as compared to one phaser acting alone but the torque capacity of the overall phase changer unit is reduced assuming the same piezo actuator capacity.

Figure 7:
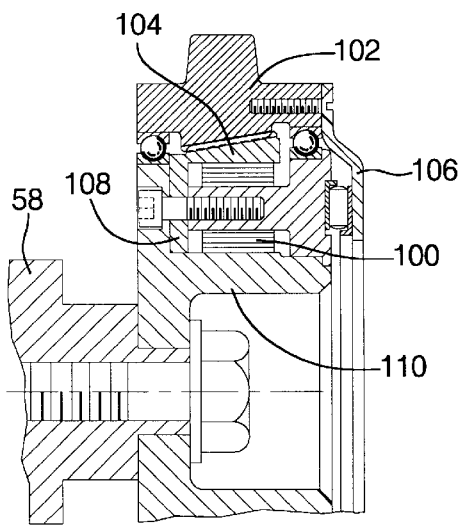
FIG. 7 is a fragmentary cross-sectional view illustrating a beveled drive tooth arrangement for taking up lash.

FIG. 7 illustrates a variation applicable to the previously described embodiments in which a sprocket/ring gear 102 and an associated flexible spline 104 are both provided with beveled teeth or other drive surfaces engaged at lobes of the spline 104 as previously described. A belleville spring 106 or other suitable biasing means is provided to bias ring gear 102 axially against the spline 104 at their points of engagement, to take up lash between the drive members at these points. Alternatively, the spline 104 could be urged against the ring gear 102 by a spring. The spline 104 has a flange 108 fixed to a hub 110 that is in turn fixed to a camshaft 58.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A cam phaser for controlling the timing of a camshaft driven from a crankshaft of an associated engine, said phaser comprising:

a ring gear drivably connected with one of the crankshaft and camshaft, said ring gear having a toothed side;

a flexible spline including a toothed side and drivably connected with the other of the crankshaft and camshaft;

a piezoelectric wave generator engaging the flexible spline and deflecting it into a nonround configuration having at least one projecting lobe wherein teeth of the toothed side engage teeth of the toothed side of the ring gear, the flexible spline having a differential number of teeth from the ring gear that is a multiple of the number of lobes formed on the flexible spline and engaging the ring gear;

said wave generator operating to rotate in a wave the circumferential position of the at least one lobe relative to the flexible spline, causing a change in the phase of the flexible spline relative to the ring gear equal to the spacing of said differential number of teeth for each revolution of the wave formed by the wave generator.

2. A cam phaser as in claim 1 wherein said wave generator engages a second side of the flexible spline radially opposite from the toothed side.

3. A cam phaser as in claim 2 wherein the toothed side of the ring gear is the inside, the toothed side of the flexible spline is the outside and the flexible spline has fewer teeth than the ring gear, whereby the phase change of the flexible spline relative to the ring gear is opposite to the direction of the wave.

4. A cam phaser as in claim 2 wherein the toothed side of the ring gear is the outside, the toothed side of the flexible spline is the inside and the flexible spline has more teeth than the ring gear, whereby the phase change of the flexible spline relative to the ring gear is in the direction of the wave.

5. A cam phaser as in claim 2 wherein said wave generator comprises a plurality of piezoelectric element stacks extending radially between the second side of the flexible spline and an opposing side of a second ring element drivably connected with another of said crankshaft and camshaft.

6. A cam phaser as in claim 5 wherein said ring gear and said second ring element are concentric inner and outer members, said inner member being fixed to one of said crankshaft and camshaft for rotation therewith and said outer member including external teeth for connecting with the other of said crankshaft and camshaft.

7. A cam phaser as in claim 6 wherein said inner member is connected to the camshaft.

8. A cam phaser for controlling the timing of a camshaft driven from a crankshaft of an associated engine, said phaser comprising:

an outer ring gear drivably connected with one of the crankshaft and camshaft, said ring gear having a toothed inside;

a flexible spline including a toothed outside and drivably connected with the other of the crankshaft and camshaft;

a piezoelectric wave generator engaging the flexible spline and deflecting it into a nonround configuration, the toothed outside having at least one projecting lobe wherein teeth of the toothed outside engage teeth of the toothed inside of the outer ring gear, the flexible spline having a differential number of teeth less than the ring gear that is a multiple of the number of lobes formed on the flexible spline and engaging the ring gear;

said wave generator operating to rotate in a wave the circumferential position of the at least one lobe relative to the flexible spline, causing a change opposite to the direction of the wave in the phase of the flexible spline relative to the outer ring gear equal to the spacing of said differential number of teeth for each revolution of the wave formed by the wave generator.

9. A cam phaser as in claim 8 wherein the outer ring gear is connected to the crankshaft, the flexible spline is connected to the camshaft, the wave generator forms two opposite lobes of the flexible spline engaging the outer ring gear and the flexible spline has two less teeth than the outer ring gear, resulting in a phase change of two teeth for each revolution of the waves formed in the flexible spline and in the opposite direction of rotation.

10. A cam phaser for controlling the timing of a camshaft driven from a crankshaft of an associated engine, said phaser comprising:

an inner ring gear drivably connected with one of the crankshaft and camshaft, said ring gear having a toothed outside;

a flexible spline including a toothed inside and drivably connected with the other of the crankshaft and camshaft;

a piezoelectric wave generator engaging the flexible spline and deflecting it into a nonround configuration, the toothed inside having at least one projecting lobe wherein teeth of the toothed inside engage teeth of the toothed outside of the inner ring gear, the flexible spline having a differential number of teeth more than the ring gear that is a multiple of the number of lobes formed on the flexible spline and engaging the ring gear;

said wave generator operating to rotate in a wave the circumferential position of the at least one lobe relative to the flexible spline, causing a change in the direction of the wave in the phase of the flexible spline relative to the inner ring gear equal to the spacing of said differential number of teeth for each revolution of the wave formed by the wave generator.

11. A cam phaser as in claim 10 wherein the inner ring gear is connected to the camshaft, the flexible spline is connected to the crankshaft, the wave generator forms two opposite lobes of the flexible spline engaging the inner ring gear and the flexible spline has two more teeth than the inner ring gear, resulting in a phase change of two teeth for each revolution of the waves formed in the flexible spline and in the direction of rotation.

12. A cam phaser for controlling the timing of a camshaft driven from a crankshaft of an associated engine, said phaser comprising:

a ring member drivably connected with one of the crankshaft and camshaft, said ring member having a drive transmitting side;

a flexible spline including a drive transmitting side and drivably connected with the other of the crankshaft and camshaft;

a piezoelectric wave generator engaging the flexible spline and deflecting it into a nonround configuration having at least one projecting lobe wherein the drive transmitting side of the flexible spline engages the drive transmitting side of the ring member, the flexible spline having a differential length from that of the ring member;

said wave generator operating to rotate in a wave the circumferential position of the at least one lobe relative to the flexible spline, causing a change in the phase of the flexible spline relative to the ring member equal to the extent of said differential length for each revolution of the wave formed by the wave generator.

13. A cam phaser as in claim 12 wherein said drive transmitting sides of the ring member and the flexible spline are beveled and the cam phaser includes means biasing one of the ring member and flexible spline axially against the other to take up lash occurring in the drive interface of the ring member and spline.

14. A cam phaser as in claim 12 wherein said drive transmitting sides have friction engaging surfaces.

15. A cam phaser as in claim 12 wherein said drive transmitting sides have interengaging toothed surfaces.

16. A cam phaser as in claim 12 and including:
  a second ring member drivably connected with the other of said crankshaft and camshaft and having a drive transmitting side; and
  a second flexible spline drivably connected with said one if the crankshaft and camshaft through said first named ring member and flexible spline;
  said piezoelectric wave generator also engaging said second flexible spline and deflecting it into a nonround configuration having at least one projecting lobe wherein the drive transmitting side of the second flexible spline engages the drive transmitting side of the second ring member, the second flexible spline having a differential length from that of the second ring member;
  said wave generator also operating to rotate in a wave the circumferential position of the at least one lobe relative to the second flexible spline, causing a change in the phase of the second flexible spline relative to the second ring member equal to the extent of said differential length for each revolution of the wave formed by the wave generator.

17. A cam phaser as in claim 16 wherein said first named ring member and flexible spline are concentric with said second ring member and flexible spline and wave generator is disposed radially between said flexible splines.

* * * * *